United States Patent [19]

Smith, Jr.

[11] Patent Number: 5,570,539
[45] Date of Patent: Nov. 5, 1996

[54] FOAM SOCK APPLICATOR

[76] Inventor: Robert E. Smith, Jr., 402 N. Sheridan Ave., Ottumwa, Iowa 52501

[21] Appl. No.: 510,858

[22] Filed: Aug. 3, 1995

[51] Int. Cl.⁶ .................................................. A01G 13/00
[52] U.S. Cl. ...................................................... 47/1.5; 47/2
[58] Field of Search ............................. 47/2 CCB, 2, 1.5

[56] References Cited

U.S. PATENT DOCUMENTS

| | | |
|---|---|---|
| 1,825,648 | 9/1931 | Hewitt ........................................... 47/1.5 |
| 2,123,988 | 7/1938 | Corley ........................................... 47/1.5 |
| 3,077,701 | 2/1963 | Osmun ........................................... 47/1.5 |
| 3,563,461 | 2/1971 | Cole, Jr. et al. ...................... 47/2 CCB |
| 3,618,856 | 11/1971 | Sachnik . |
| 3,669,898 | 6/1972 | Butler .................................. 47/2 CCB |
| 3,979,326 | 9/1976 | Chatterton . |
| 4,070,302 | 1/1978 | Chatterton . |
| 4,716,678 | 1/1988 | Ballu ............................................. 47/1.5 |
| 4,733,497 | 3/1988 | Frikton ........................................ 47/1.5 |
| 5,433,758 | 7/1995 | Thompson et al. ............................. 47/2 |

FOREIGN PATENT DOCUMENTS 2161685  1/1986  United Kingdom .................... 47/1.5

Primary Examiner—Terry Lee Melius
Assistant Examiner—Joanne C. Downs
Attorney, Agent, or Firm—Foley & Lardner

[57] ABSTRACT

A foam marking apparatus and method for applying foam to both pre-emergence and post-emergence crops in order to demark the boundaries of a spray application. The foam marking apparatus includes a foam generating system, a distribution line, and a foam sock applicator. The foam sock applicator includes a body having at least one opening and a flexible finger which aids in the application of the foam.

20 Claims, 2 Drawing Sheets

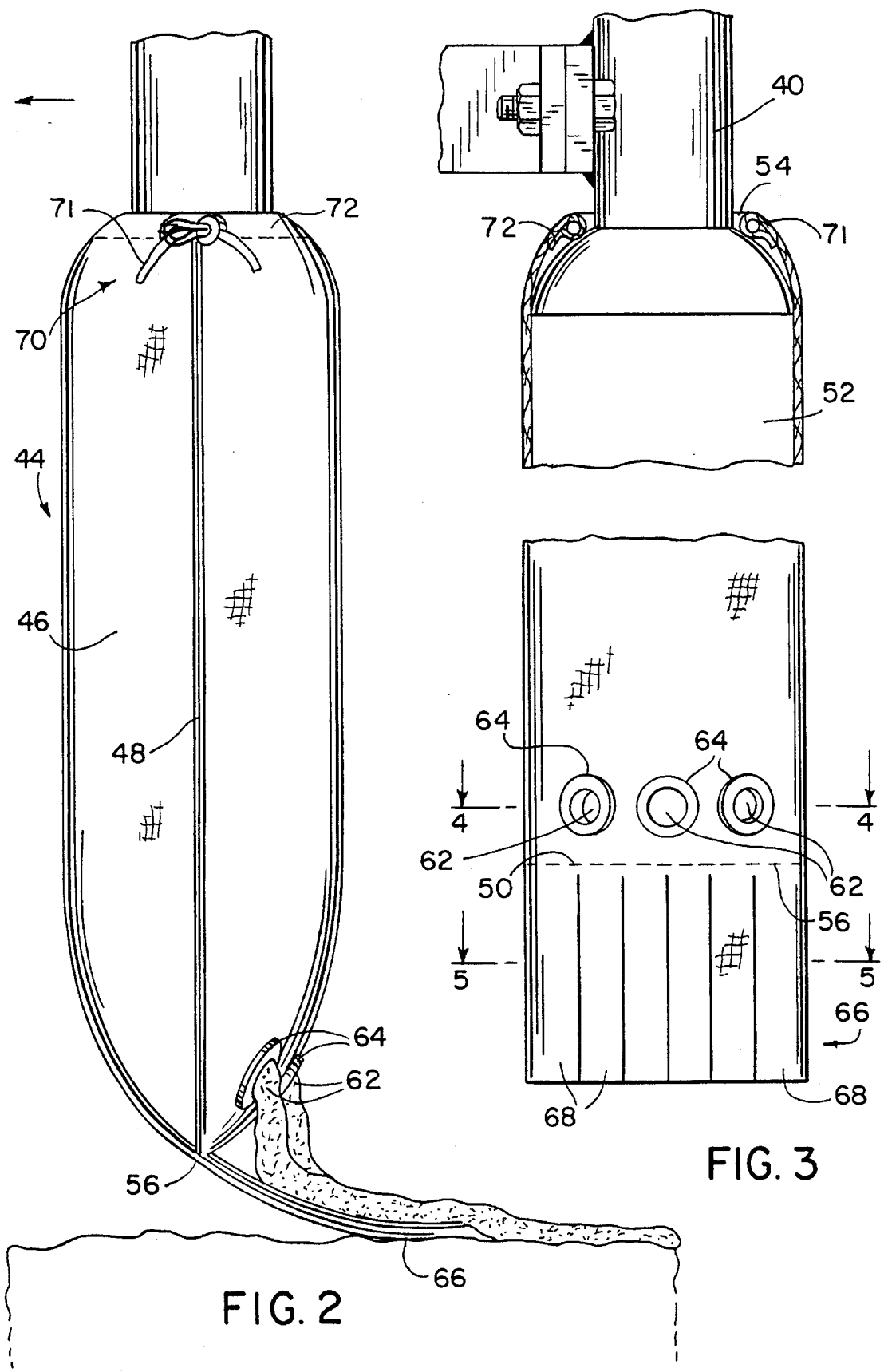

FOAM SOCK APPLICATOR

FIELD OF THE INVENTION

This invention relates to a foam generation and application apparatus and more particularly to a foam sock applicator for marking crops with a foam marker.

BACKGROUND OF THE INVENTION

The use of foam for marking crops is generally used for marking the edges of spray swaths when applying fertilizer or pesticide solutions to crops. The application of a foam line enables an operator to demark areas of a crop which have been treated with a spray application to ensure proper alignment of the spray swaths upon reentry into the field. Foam is generated on the back of a tractor or a towed implement and utilized to mark the edge of the spray application to ensure the crops are not treated twice.

In general there are two types of conventional foam generating systems that are utilized for foam marking operations. The first system is commonly referred to as a "tank mix" system. In this system, foam marker solution and air under pressure are combined. The air supplied to the solution under pressure provides two actions. First, air injected into the foam concentrate, causes the concentrate to form a thick foam. Second, the air pressure forces the produced foam through the distribution lines.

The second type of system utilizes "generating tubes." In this system, air under minimal pressure is used to move foam marker solution from the mix tank to the generating tubes. At the same time that the mixed foam solution enters the tops of these tubes, air under optimum operating pressure is injected into the bottoms of the tubes thus mixing with the foam solution and creating the foam. Again, the injected air acts to push the foam through the distribution lines.

In both types of systems, there are some similarities. The amount of mixed foam solution compared to the amount of air being injected can be varied. Doing such can create foam quality varying from wet and heavy to dry and light, each having its advantages and disadvantages. The frequency in which the air is injected into the system can be varied as well. In foam generating equipment, the air injection oscillates between "on" and "off" according to settings chosen by the equipment operator. This allows for variation in spacing between foam droppings.

In agricultural marking applications, the foam is translated through the distribution line or hose extending from the foam generation equipment to the end of a boom where the foam is applied to the crop. The foam may be applied to the crop directly from the hose, or through an intermediary collection or dispersion cup attached to the end of the hose.

A typical dispersion cup is bell shaped or frusto conical having an opening attached to the distribution line and a second larger opening. The foam collects within the cud forming the foam droppings to be applied. In a typical system the compressor is run intermittently to allow foam to accumulate within the dispersion cup, after which it falls from the cup marking the crops with a single blob. In this manner, blobs of foam are dropped periodically to mark the outer area of the crop which has been treated. Both foam generating systems described above contain two sets of lines depositing foam, one each on the left and right sides of the equipment. The hose through which the foam is discharged may be selectively changed depending which way the tractor is traveling.

Under normal circumstances, current foam producing equipment works for pre-emergence applications on all types of crops, but only for post emergence applications on some. The prior art as described works satisfactorily on pre-emergence crops by discharging a drop or blob of foam upon the ground. However, in post-emergence crops the drop or blob of foam is too heavy to rest on top of the foliage. As a result, the foam falls to the ground between the rows of crops, instead of resting on top of the leaves where it would be visible to the operator. If the blob of foam is light enough to rest on top of the leaves, it dissipates or blows away before the operator reaches the end of the field, turns around, and guides back along the marks.

Consequently it would be desirable to have a foam marking apparatus and method that would allow for application of foam on both pre-emergence and post-emergence crops. It would also be desirable to have a foam marking system that would allow for foam to be applied in a continuous line as opposed to a series of drops.

SUMMARY OF THE PRESENT INVENTION

The present invention is concerned with a foam marking apparatus conveyed by a tractor or other field vehicle for marking crops with foam. The apparatus includes a foam generation system having a generator, compressor and foam tank to produce foam. The apparatus further includes a distribution line having a first end attached to the foam generation system and extending the length of a boom attached to the field vehicle. Also included in the apparatus is a foam sock to apply the foam. The foam sock includes a body having a wall, an open end, and a closed end. The foam sock further includes at least one opening within the wall, and a flexible finger extending from the closed end. A foam sock cavity is defined by the wall and the closed end. The foam sock is attached to the end of the distribution line to permit communication between the distribution line and the cavity.

The present invention also covers a method for applying foam to a crop surface to demark a line on both pre-emergence and post-emergence crops. The method includes the step of supplying foam to a foam sock having an open end, a closed end, at least one opening adjacent the closed end, and a plurality of flexible fingers extending from the closed end. The method also includes the step of dragging the fingers over the surface of the crops to be marked. The method further includes forcing the foam through the openings to the top of the fingers. Finally the method includes the step of depositing the foam from the top of the fingers to the surface of the crops to be marked.

Other principal features and advantages of the invention will become apparent to those skilled in the art upon review of the following drawings, the detailed description and the appended claims.

BRIEF DESCRIPTION OF THE DRAWINGS

The invention will hereafter be described with reference to the accompanying drawings, wherein like reference numerals denote like elements, and:

FIG. 2 is an isometric view of the foam sock;

FIG. 3 is a front view of the foam sock;

Figure 1:
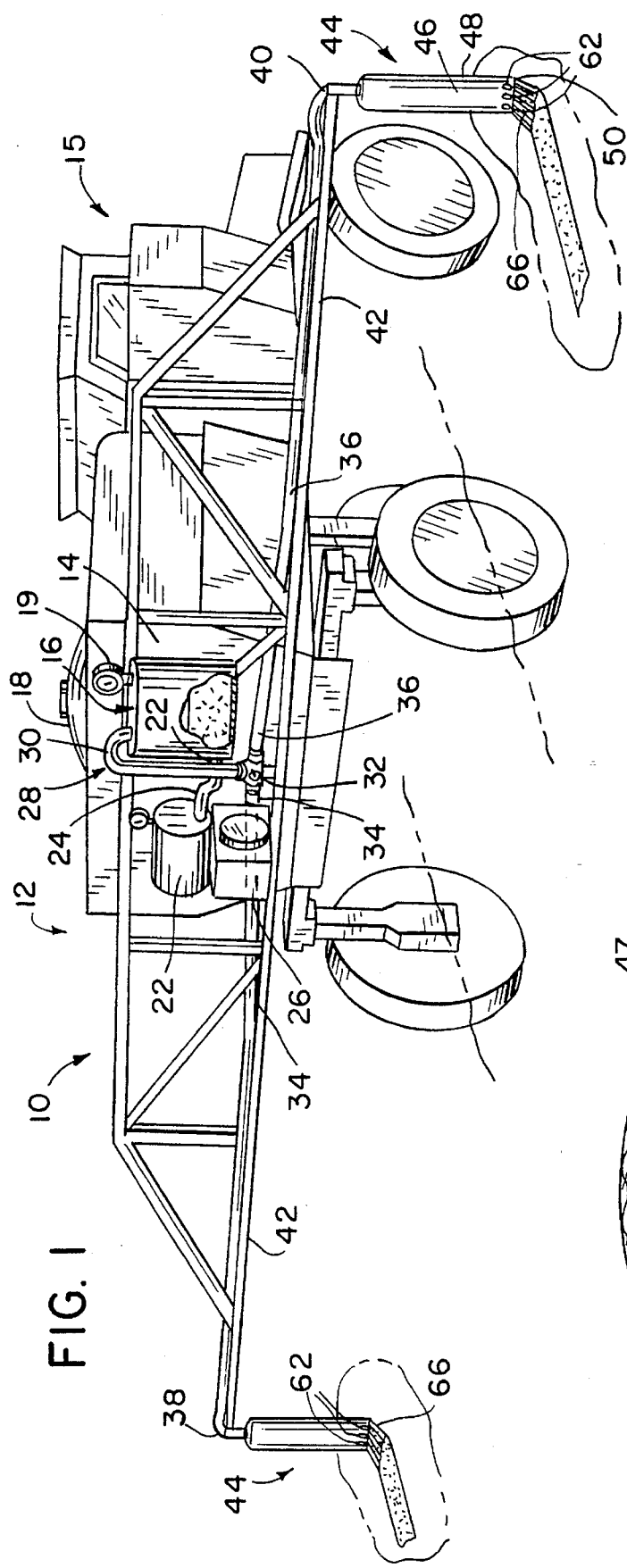
FIG. 1 is a schematic view of the foam marking apparatus.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENTS

Referring to FIGS. 1 and 2, an overview of an exemplary foam marking apparatus 10 will be described. Foam marking apparatus 10 includes a foam generation system 12 having a generator 26, an air compressor 22, and a foam tank 14. Foam marking apparatus further includes a distribution line 28 and a foam sock 44 attached to ends 38, 40 of distribution line 28. Foam sock 44 includes at least one distribution opening 62 and at least one flexible finger 66.

Referring to FIGS. 1 and 2, an overview of the operation of the above described foam marking apparatus 10 will be described. A foam marking solution is mixed with water in foam tank 14. Generator 26 is intermittently run to compress air in air compressor 22. The compressed air is then introduced into foam tank 14 to produce a foam which is forced through distribution line 28 to foam sock 44. The foam collects within foam sock 44, and is forced through openings 62. The foam is then deposited on flexible finger 66, and applied to either the ground of pre-emergence crops or the canopy of post-emergence crops.

Referring to FIGS. 1–5, a preferred embodiment will now be described in greater detail. Foam generation marking apparatus 10 is secured directly to a field vehicle 15 such as a tractor or a towed implement. In the preferred embodiment foam generation system 12 is a "tank-mix" system in which a foam concentrate is mixed with water in foam tank 14. Foam tank 14 includes an inlet 16 and an outlet 18. Foam tank 14 further includes a gauge 19. An additional air inlet 20 is attached to foam tank 14. Air compressor 22 includes an air hose or line 24 which is removeably attached to air inlet 20. Generator 26 is preferably electrically connected to air compressor 22 to provide power for its operation. However, compressor 22 could be powered in a variety of ways, including a gas or diesel engine or a direct drive couple to field vehicle 15.

A distribution line 28 includes a first end 30 removeably attached to outlet 18 on foam tank 14. Distribution line 28 preferably further includes a three way distribution valve 32 for selectively routing foam between a left distribution line 34 and a right distribution line 36. Left and right distribution lines 34, 36 are supported by a boom 42. Left distribution line 34 includes an end 38 located at the far left end of boom 42 such that end 38 extends in a downward direction as illustrated in FIG. 1. Similarly, right distribution line 36 includes an end 40 located at the far right end of boom 42 such that the end 40 extends in a downward direction. Although, a single boom utilizing a pair of foam socks is illustrated, a single foam sock on a pivotable boom is another example of a potential arrangement.

Referring to FIGS. 2–5, foam sock 44 includes a body 46 having a wall 47 formed from a flexible material. In the preferred embodiment body 46 is formed from 22 oz. Vinyl fabric. However, numerous other fabrics or materials may be used as well. Body 46 is preferably formed from a single piece of fabric having a vertical hem 48 extending the entire length of foam sock 44. Body 46 further includes a horizontal seam 50 to form a cavity 52 having an open end 54 and a closed end 56 at the horizontal seam 50. When foam sock 44 is in its flattened position it is defined by a first side 58 and a second side 60.

Body 46 further includes at least one opening 62 located on first side 58 proximate closed end 56. Although the openings are preferably through first side 58, they could also be formed through side 60 or both sides. In the preferred embodiment, body 46 includes three openings 62 proximate the second closed end 56 such that the openings are at different angles when cavity 52 is filled with foam. In another embodiment four openings 62 are located proximate the second closed end 56. Each opening 62 preferably includes a grommet 64 having, for example, a one half inch inner diameter to reinforce openings 62 and provide a conduit for the foam to pass. However, single or multiple grommets of a variety of sizes may be utilized depending on the particular application.

Figure 5:
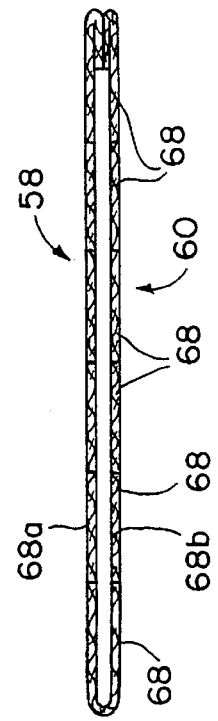
FIG. 5 is a cross-sectional view taken generally along line 5—5 of FIG. 3.
Figure 4:
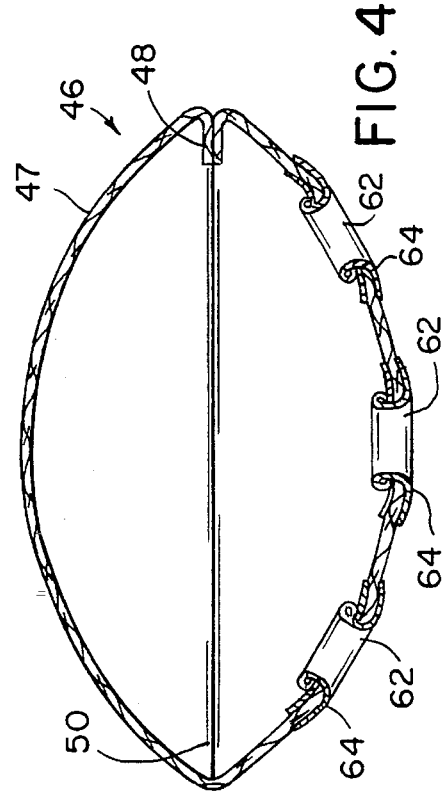
FIG. 4 is a cross-sectional view taken generally along line 4—4 of FIG. 3.

Referring to FIGS. 3 and 5, foam sock 44 further includes at least one flexible finger 66 extending from closed end 56 at horizontal seam 50. In the preferred embodiment, there are six flexible fingers 68. However, any number of flexible fingers may be used. Each finger 68 includes an elongate member comprising a first portion 68a extending from first side 58 of foam sock 44, and a second portion 68b extending from second side 60 of foam sock 44. In the preferred embodiment the length of the fingers 68 is approximately 3¼ inches, and the width of each finger is approximately 1⅛ inches.

Foam sock 44 includes a fastener 70 disposed at open end 54 as illustrated in FIG. 2. Preferably fastener 70 is a draw string 71 threaded through a top hem 72 proximate open end 54, but a variety of fasteners, including VELCRO (TM), bolts and nuts, or hose clamps could be used. In the illustrated embodiment, foam sock 44 is removeably attached to end 40 of right distribution line 36 and a second foam sock 44 is removeably attached to end 38 of left distribution line 34. Opening 54 of foam sock 44 is secured over end of distribution lines 38,40 in the preferred embodiment by draw string 70. Additionally, a dispersion cup may be attached to distribution line ends 38, 40. In this case foam sock cavity 52 extends over the dispersion cup and is tied around the ends of distribution lines 38, 40 with draw string 70. Foam sock 44 is connected to distribution line 28 in such a manner as to permit foam sock 44 to flex and rotate about boom 42.

Referring again to FIGS. 1 and 2, the operation of the foam marking apparatus 10 will be described. A foam concentrate solution such as AGRI-BEST FOAM MARKER manufactured by Share Corporation of Milwaukee, Wis. is introduced into foam tank 14 through inlet 16. An appropriate amount of water is mixed with the foam concentrate also through inlet 16. Generator 26 is intermittently run to power air compressor 22. Compressed air is introduced into foam tank 14 through air inlet 20 producing a foam. The introduction of compressed air in foam tank 14 forces the foam through outlet 18 and subsequently through distribution lines 34,36 to foam socks 44. Three way distribution valve 32 may be utilized to selectively route the foam through left or right distribution lines 34, 36.

A foam sock 44 is fastened to ends 38,40 of distribution lines 34, 36 such that first side 58 including openings 62 preferably faces in a direction rearward of the tractor. As the foam is forced through the distribution lines 34.36 it is deposited within cavity 52 of foam sock 44. Once cavity 52 is filled with foam, the foam is forced through openings 62. The foam is then deposited on flexible fingers 68, and applied to either the ground of pre-emergence crops or the canopy of post-emergence crops. As the tractor is moved in a forward direction flexible fingers 68 extend rearward and brush against either the ground in pre-emergence crop applications or the canopy in post-emergence crops. In the latter case, where foam is being applied to the canopy of post-emergence crops flexible fingers 68 act to provide a uniform application of the foam stream. Foam is continuously applied as long as compressed air is being introduced into foam tank 14. By controlling the introduction of compressed air into the foam tank 14, application of foam may be applied in a discontinuous manner. Although it is preferred that foam be deposited on the fingers and then spread to the field or crop, the foam could also be deposited through openings 62 located beneath fingers 68. The fingers would then spread the foam onto the surface being marked.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A foam marking apparatus conveyed by a field vehicle for marking crops with foam, the apparatus comprising:

a foam generation system to produce foam;

a distribution line having a first end and a second end, the first end coupled to the foam generation system;

a foam sock including a body having an outer wall defining an internal cavity with an open end and a closed end, at least one opening through the wall intermediate the open and closed ends, the at least one opening having a sufficient cross-sectional area to permit a flow of foam therethrough, and a flexible finger extending from the closed end, the foam sock being attached proximate its open end to the second end of the distribution line to permit communication between the distribution line and the cavity.

2. The foam marking apparatus as recited in claim 1, wherein the foam sock includes a connector proximate the open end of the body to attach the foam sock to the second end of the distribution line.

3. The foam marking apparatus as recited in claim 2, wherein the connector is a draw cord held within a hem proximate the open end of the body.

4. The foam marking apparatus as recited in claim 1, further including a dispersion cup attached to the second end of the distribution line, wherein the foam sock is tied about the dispersion cup.

5. The foam marking apparatus as recited in claim 1, wherein the foam sock is attached to the distribution line such that the at least one opening is facing opposite the direction of travel of the tractor.

6. The foam marking apparatus as recited in claim 5, wherein said at least one opening includes a reinforcement grommet.

7. The foam marking apparatus as recited in claim 5 wherein there are three openings.

8. The foam marking apparatus as recited in claim 1 wherein the flexible finger includes a plurality of discrete fingers.

9. A foam sock for applying foam supplied by a foam generation system attached to a field vehicle and delivered through a distribution line for marking a crop, comprising:

a foam sock including a body having an outer wall defining an internal cavity, an open end, a closed end, at least one opening through the wall intermediate the open and closed ends and proximate the closed end, the at least one opening having a sufficient cross-sectional area to permit a flow of foam therethrough, and at least one flexible finger extending from the closed end.

10. The foam sock as recited in claim 9, wherein the foam sock includes a connector proximate the open end of the body configured to attach the foam sock to the distribution line.

11. The foam sock as recited in claim 10, wherein the connector is a draw cord held within a hem proximate the open end of the body.

12. The foam sock as recited in claim 9, wherein the foam sock is configured for attachment to the distribution line such that the at least one opening is facing opposite the direction of travel of the field vehicle.

13. The foam sock as recited in claim 12, wherein there are three openings.

14. The foam sock as recited in claim 9, wherein the flexible finger includes a plurality of discrete fingers.

15. A method of applying a foam marker to a field containing pre-emergence or post-emergence crops, comprising the steps of:

supplying foam to a flexible foam sock having an outer side wall defining an open end and a closed distal end, at least one opening located through the side wall intermediate the open end and closed distal end and adjacent said closed distal end;

dragging the closed distal end over the surface of the crops to be marked;

forcing a flow of foam through the at least one opening; and depositing the foam on the surface of the crops to be marked.

16. The method as recited in claim 15, wherein the step of supplying foam further includes the steps of:

producing foam in a foam generation system;

forcing the foam through a distribution line; and dispensing the foam in the foam sock.

17. The method as recited in claim 16, wherein the step of producing the foam in a foam generation system includes the step of:

regulating the flow of foam to produce an intermittent flow of foam from the foam sock.

18. The method as recited in claim 17, further comprising the step of:

selectively regulating the flow of foam to a right or left distribution line to permit application of foam on either or both sides of a field vehicle.

19. The method as recited in claim 15, further comprising the step of attaching a flexible finger to the closed distal end of the foam sock to facilitate application of foam flowing through the at least one opening.

20. The method as recited in claim 19, further comprising the step of separating the flexible finger into at least three distinct fingers.

* * * * *